United States Patent [19]

Arora et al.

[11] Patent Number: 5,760,108
[45] Date of Patent: *Jun. 2, 1998

[54] SELF-DISPERSING CURABLE EPOXY RESIN ESTERS, DISPERSIONS THEREOF AND COATING COMPOSITIONS MADE THEREFROM

[75] Inventors: Kartar S. Arora, Chalfont; Grannis S. Johnson, New Hope; James Aloye, Reading, all of Pa.

[73] Assignee: Henkel Corporation, Plymouth Meeting, Pa.

[ * ] Notice: The term of this patent shall not extend beyond the expiration date of Pat. No. 5,565,505.

[21] Appl. No.: 735,298

[22] Filed: Oct. 22, 1996

[51] Int. Cl.$^6$ ...................................... C08L 63/02
[52] U.S. Cl. .................. 523/404; 523/415; 523/420; 525/526; 528/111
[58] Field of Search ........................ 523/404, 420, 523/415; 525/526; 528/111

[56] References Cited

U.S. PATENT DOCUMENTS

| | | | |
|---|---|---|---|
| 2,709,690 | 5/1955 | Narracott | 260/18 |
| 3,249,412 | 5/1966 | Kolek et al. | 65/3 |
| 3,301,804 | 1/1967 | Zora et al. | 260/29.2 |
| 3,468,779 | 9/1969 | Slater et al. | 523/414 |
| 3,634,348 | 1/1972 | Carter et al. | 260/18 |
| 4,107,112 | 8/1978 | Latta et al. | 260/18 |
| 4,154,709 | 5/1979 | Ukita et al. | 260/22 |
| 4,166,054 | 8/1979 | Meeske et al. | 260/23 |
| 4,303,581 | 12/1981 | Levine et al. | 260/18 |
| 4,315,044 | 2/1982 | Elmore et al. | 427/386 |
| 4,358,551 | 11/1982 | Shimp | 523/414 |
| 4,533,254 | 8/1985 | Cook et al. | 366/176 |
| 4,608,406 | 8/1986 | Williams et al. | 523/424 |
| 5,565,505 | 10/1996 | Papalos et al. | 523/404 |
| 5,565,506 | 10/1996 | Papalos et al. | 523/404 |

OTHER PUBLICATIONS

"Water–Reducible Coatings via Epoxy Resin Modification with Jeffamine (Reg. TM) ED–2001 and Jeffamine (Reg TM) M–1000".
Technical literature of Synthron Inc., Morgantown, North Carolina.
W.C. Griffith, "Emulsions:", *Encyclopedia of Chemical Technology*, vol. 8, pp. 900–930, John Wiley and Sons, New York, NY, 1979.
Wicks, Z.W., Jr., "Drying Oils", *Encyclopedia of Polymer Science and Technology*, vol. 5, pp. 203–214, John Wiley & Sons, Inc., NY, 1986.
E. Hafslund, "Distillation", *Encyclopedia of Chemical Technology*, vol. 7, pp. 849–891, John Wiley and Sons, New York, NY, 1979.
F. Standiford, "Evaporation", *Encyclopedia of Chemical Technology*, vol. 9, pp. 472–493, John Wiley and Sons, New York, NY, 1980.

*Primary Examiner*—Frederick Krass
*Attorney, Agent, or Firm*—Wayne C. Jaeschke; John Daniel Wood; Steven J. Trzaska

[57] ABSTRACT

Self-dispersing curable epoxy resin ester dispersions prepared by a process comprising reacting a self-dispersing curable epoxy resin based on a polyoxyalkyleneamine with a fatty acid selected from the group consisting of drying oil and semi-drying oil fatty acids, are provided. The self-dispersing curable epoxy resin is based on a polyoxyalkyleneamine. Thus, a polyoxyalkyleneamine was present as a chemical precursor of the epoxy resin or a starting material therefor. The self-dispersing curable epoxy resin ester of the invention is in the form of an aqueous dispersion. When dried, films of the self-dispersing curable epoxy resin ester dispersion are useful as a coating composition.

27 Claims, No Drawings

SELF-DISPERSING CURABLE EPOXY RESIN ESTERS, DISPERSIONS THEREOF AND COATING COMPOSITIONS MADE THEREFROM

CROSS-REFERENCE TO RELATED APPLICATIONS

This application claims priority from U.S. provisional application Ser. No. 60/008,025, filed Oct. 27, 1995, the disclosure of which is incorporated herein by reference.

FIELD OF THE INVENTION

The present invention relates to a method of making aqueous epoxy resin ester dispersions. The dispersions are useful in preparing coating compositions comprising the same.

BACKGROUND OF THE INVENTION

Epoxy resins have come into widespread use as components in coating compositions. Coatings which comprise cured epoxy resins are valued for their durability, chemical resistance, and excellent adhesion to a broad range of substrates. Particularly desirable from an environmental point of view are epoxy resins which may be applied to a substrate with either minimal or no release of volatile organic components. Toward this end, there has been much research directed to the development of aqueous dispersions and emulsions of epoxy resins.

One class of aqueous epoxy dispersions employs one or more additives, also known as dispersants or emulsifiers or surfactants, which are necessary to stabilize the epoxy resin in the dispersion or emulsion form. Representative examples include an aqueous epoxy dispersion as described in U.S. Pat. No. 3,301,804 (employing the reaction product of a boric acid ester derived from boric acid with both an alkylene glycol and a beta-dialkyl-substituted aminoalkanol as an emulsifier), U.S. Pat. No. 3,634,348 (employing a phosphate ester as an emulsifying agent), U.S. Pat. No. 3,249,412 (employing in combination a cationic emulsifying agent selected from the group consisting of imidazolines and amides and a non-ionic emulsifying agent), and Specialty Chemicals Bulletin SC-021 titled "Water-Reducible Coatings via Epoxy Resin Modification with Jeffamine (Reg. TM) ED-2001 and Jeffamine (Reg. TM) M-1000" available from Texaco Chemical Company, Bellaire, Tex. Another example comes from the technical literature of Synthron Inc., Morgantown, N.C., which discloses the use of PROX-E-141, a diglycidyl ether of Pluronic (Reg. TM) F88 diol (an ethylene oxide—propylene oxide—ethylene oxide block copolymer available from BASF Performance Chemicals, Parsippany, N.J.) as a reactive dispersant for epoxy resins. PROX-E-141 can act as a dispersant for epoxy resin in water, but then will react along with the epoxy resin when exposed to an amine functional curing agent.

The use of an additive to provide stability to an aqueous epoxy dispersion is preferably avoided as such additives add additional cost, formulation complexity, and may potentially interfere with the performance of a coating derived from the aqueous epoxy dispersion.

It is known to prepare aqueous epoxy dispersions from self-emulsifying epoxy resins. For example, U.S. Pat. No. 4,315,044 describes a stable epoxy dispersion composition comprising (1) an aqueous medium; and (2) between about 50–70 weight percent of self-emulsifying epoxy resin which is the addition product of reactants comprising (a) 40–90 parts by weight of diglycidyl ether of dihydric phenol, (b) 5–35 parts by weight of dihydric phenol, and (c) 2–15 parts by weight of diglycidyl ether of polyoxyalkylene glycol, wherein the molecular weight of the epoxy resin is in the range between about 500–20,000. The dispersion can also contain 1–25 weight percent based on resin solids of a water-immiscible $C_8$–$C_{20}$ aliphatic monoepoxide reactive diluent.

U.S. Pat. No. 4,608,406 describes stable aqueous epoxy resin dispersions comprised of (1) an aqueous medium; and (2) between about 50 to about 70 weight percent of self-emulsifying epoxy resin which is the addition reaction product of (a) 40–90 parts by weight of a diglycidyl ether of a dihydric phenol; (b) 5–35 parts of a dihydric phenol; (c) 2–15 parts by weight of a diglycidyl ether of a polyoxyalkylene glycol; and (d) 2 to 15 parts by weight of an alkyl phenol-formaldehyde novolac resin wherein the molecular weight of the epoxy resin is in the range of about 1000 to about 20,000. The stable dispersions can be modified by the addition of about 1 to about 25 weight percent of an aliphatic monoepoxide reactive diluent. In an attempt to improve freeze-thaw stability, the stable aqueous epoxy resin dispersions can be modified by the addition of about 5–20 weight percent, based on resin solids weight, of a water-miscible solvent which, preferably, is a 2 to 8 carbon glycol or glycol ether.

It has long been known that the epoxy functionality of certain epoxy resins will form esters when reacted with drying oil fatty acids. For example, organic solvent soluble coating compositions made from epoxy resins esterified with drying oil fatty acids and phosphoric acid are described in U.S. Pat. No. 2,709,690.

U.S. Pat. No. 4,107,112 (Latta, Jr., et. al.) discloses a binder composition for binding soil particles, the composition comprising an epoxy resin ester which is the reaction product of a bisphenol A-glycidyl ether type epoxy resin with linseed fatty acids in which the molar ratio of fatty acid to bisphenol A units is between about 0.5 to 1.0, together with free linseed fatty acids, a solvent, preferably a volatile solvent, an emulsifying agent, and water, the water being present in an amount of about one-third of the total weight of the chemical in its concentrated form prior to subsequent mixing with additional water prior to, or during, mixture with soil. It is stated that it is preferred that the composition include an emulsifier in the concentrated form.

U.S. Pat. No. 4,166,054 (Meeske, et. al.) discloses an air curable resin solution useful for surface coating and impregnation comprising (I) the reaction product of (A) from about 50% to about 65% by weight based upon the total weight of (A) and (B) of an epoxy resin ester of a partially conjugated unsaturated fatty acid and (B) from about 50% to about 35% by weight based upon the total weight of (A) and (B) of a blend of reactive monomer possessing reactive double bonds, at least one of which must be an unsaturated monobasic acid in the presence of (II) an alcohol ether of a glycol and subsequently reacted with (III) an amine and then (IV) dispersed in water. The monomer (B) portion consists of a mixture of 20–28% of unsaturated monobasic acids having a polymerizable double bond and 80% to 72% reactive monomers having a polymerizable double bond and serves to make the resin water dilutable.

U.S. Pat. No. 4,303,581 (Levine, et. al.) discloses water-based primer-surfacer compositions for application in the automotive industry formulated in aqueous medium using a latex of an addition copolymer prepared by emulsion polymerization of a mixture of styrenic and acrylic monomers, with hydroxyl and carboxyl functionality, preferably a mixture of styrene, ethyl acrylate, 2-hydroxy-ethyl methacrylate and acrylic acid. The latex is the predominant film-forming ingredient in the composition and is combined with minor amounts of other film-forming ingredients including a water-soluble epoxy ester, preferably derived from bisphenol A, diglycidyl ether, drying oil fatty acids and a polycarboxylic acid or anhydride, e.g. maleic anhydride, and water-soluble or dispersible aminoplast resins, preferably methoxylated melamine formaldehyde resin and butoxylated urea formaldehyde resin. The epoxy ester is reacted at additional hydroxyl groups with a polycarboxylic acid or anhydride such as trimellitic acid or anhydride or, most preferably, maleic anhydride, to introduce free carboxyl groups which, of course, form water-soluble salts in alkaline medium.

SUMMARY OF THE INVENTION

It has been found that a self-dispersing curable epoxy resin ester dispersion can be prepared from the product of reacting a self-dispersing curable epoxy resin based on a polyoxyalkyleneamine with a fatty acid selected from the group consisting of drying oil and semi-drying oil fatty acids.

The self-dispersing curable epoxy resin is based on a polyoxyalkyleneamine. Thus, a polyoxyalkyleneamine was present as a chemical precursor of the epoxy resin or a starting material therefor.

The self-dispersing curable epoxy resin ester of the invention is used as a coating composition in the form of an aqueous dispersion. When cured, films of the self-dispersing curable epoxy resin ester dispersion form a protective coating.

DETAILED DESCRIPTION OF THE INVENTION

Drying and semidrying oil fatty acids are natural or synthetic fatty acids having two or more double bonds separated by single methylene groups or two or more conjugated double bonds. Natural drying and semidrying oil fatty acids are derived from triesters of glycerol wherein each ester molecule typically yields a mixture of different fatty acids, a portion of which may be fatty acids of the non-drying type, i.e. having no double bonds separated by single methylene groups nor two or more conjugated double bonds. Dehydrated castor oil is an example of a synthetic drying oil derived by the dehydration of ricinoleic acid.

Drying oils are generally considered to be those which dry to a solid film upon exposure to air. Semidrying oils are those which dry to a tacky film and nondrying oils which do not form highly viscous films upon exposure to air. Drying oils are discussed in "Drying Oils", Z. Wicks, *Encyclopedia of Polymer Science and Engineering*, vol. 5, pp. 203–214 (John Wiley & Sons, Inc., N.Y., N.Y., 1986), the disclosure of which is incorporated herein by reference. A useful tool in distinguishing between drying oils and semidrying oils is the combined linoleic and linolenic acid content, i.e. if the sum of the weight percent of linoleic acid and twice the weight percent of linolenic acid exceeds 70, the oil is a drying oil. Typical drying or semidrying oil fatty acids used in this invention will have a sum of the weight percent of linoleic acid and twice the weight percent of linolenic acid that is from about 50 to about 200, more typically from about 65 to about 150, and most typically from about 75 to about 135. A more general measure that is applicable to more highly unsaturated oils, e.g. certain fish oils, is that the oil is a drying oil if the average number of methylene groups between two double bonds or pairs of conjugated double bonds per triester glycerol molecule is greater than 2.2 (thus, there would be an average of 0.73 methylene groups between two double bonds per fatty acid molecule). Typical drying or semidrying oil fatty acids used in this invention will have an average number of methylene groups between two double bonds or pairs of conjugated double bonds per triester glycerol molecule from about 1.5 to about 6 (i.e. from about 0.5 to about 2 per molecule of fatty acid), more typically from about 2.0 to about 5 (i.e. from about 0.67 to about 1.67 per molecule of fatty acid), and most typically from about 2.2 to about 4.2 (i.e. from about 0.73 to about 1.4 per molecule of fatty acid).

The most common drying oil fatty acids are linoleic and linolenic acids which are available from vegetable sources such as linseed oil. Eicosenoic and docosenoic acids having from four to six double bonds separated by single methylene groups are available from marine oils and alpha-eleostearic acid with three conjugated double bonds is available from tung oil. Examples of sources of drying oil or semi-drying oil fatty acids are vegetable sources, e.g. safflower oil, sunflower oil, sesame oil, poppy seed oil, grape-seed oil, corn oil, cotton seed oil, rice bran oil, rubber seed oil, tung oil, tall oil, oiticica oil, canola oil, soya bean oil, dehydrated castor oil, plukenetia oil, hemp-seed oil, perilla oil, walnut oil, tobacco seed oil, and linseed oil and marine sources, e.g. menhaden oil, pilchard oil, and sardine oil. The fatty acids from natural sources will also contain some palmitic acid, stearic acid, and oleic acid, unless steps have been taken to remove such nondrying fatty acids. Drying oil fatty acids typically used in this invention will be comprised of a major amount (i.e. greater than 50 wt. %) of linoleic acid. A preferred fatty acid is EMERSOL® 315 linoleic acid, available from Henkel Corporation, Cincinnati, Ohio, and having 60 wt. % linoleic acid, 9 wt. % linolenic acid, 25 wt. % oleic acid, 4 wt. % palmitic acid, 1 wt. % stearic acid, and 1 wt. % myristic acid.

The self-dispersing curable epoxy resin used as a starting material herein can be any one of several self-dispersing curable epoxy resins that are based upon a polyoxyalkyleneamine.

In certain embodiments, the self-dispersing curable epoxy resin based on a polyoxyalkyleneamine is prepared by reacting (a) 1.0 reactive equivalents of an epoxy resin, (b) from about 0.01 to 1.0 reactive equivalents (e.g. from about 0.4 to about 0.6 reactive equivalents or from about 0.65 to about 0.95 reactive equivalents) of a polyhydric phenol, and (c) from about 0.005 to 0.5 reactive equivalents of an amine-epoxy adduct, wherein the amine-epoxy adduct is formed upon contacting 1.0 equivalents of an aliphatic polyepoxide and from about 0.3 to about 0.9 reactive equivalents of a polyoxyalkyleneamine. Such self-dispersing curable epoxy resins are described in detail in U.S. Ser. No. 08/255,732, filed Jun. 14, 1994, now U.S. Pat. No. 5,565,505 (which is a continuation-in-part of U.S. Ser. No. 08/086,288, filed Jun. 30, 1993, now abandoned) and U.S. Ser. No. 08/296,282, filed Aug. 25, 1994, now U.S. Pat. No. 5,565,506 by J. Papalos et al., entitled "Self-Dispersing Curable Epoxy Resins, Dispersions Made Therewith, and Coating Compositions Made Therefrom" (which is a continuation-in-part of U.S. Ser. No. 08/203,543, filed Mar. 1, 1994, now abandoned), the disclosures of which are incorporated herein by reference.

In other embodiments, the epoxy resin is prepared by reacting an epoxy resin with a polyoxyalkyleneamine having a molecular weight of from about 3,000 to about 15,000 in a ratio of about 0.001 to 0.060 reactive equivalents of polyoxyalkyleneamine to about 1.0 reactive equivalents of epoxy resin. Such self-dispersing curable epoxy resins are described in detail in U.S. Ser. No. 08/296,283, filed Aug. 25, 1994, now abandoned, by J. Papalos et al., entitled "Self-Dispersing Curable Epoxy Resins, Dispersions Made Therewith, and Coating Compositions Made Therefrom" (which is a continuation-in-part of U.S. Ser. No. 08/173,455, filed Dec. 27, 1993, now abandoned), the disclosures of which are incorporated herein by reference.

In yet other embodiments, the epoxy resin composition is prepared by reacting (a) 1.0 reactive equivalents of an epoxy resin, (b) from about 0.005 to 0.5 reactive equivalents of an amine-epoxy adduct, and optionally (c) from about 0.01 to 1.0 reactive equivalents of a polyhydric phenol, wherein the amine-epoxy adduct is formed upon contacting 1.0 equivalents of an aliphatic polyepoxide with from greater than about 1.0 equivalents (preferably from about 1.01 to about 2.5) reactive equivalents of a polyoxyalkyleneamine. Such self-dispersing curable epoxy resins are described in detail in U.S. Ser. No. 08/296,281, filed Aug. 25, 1994, now U.S. Pat. No. 5,604,269, by J. Papalos et al., entitled "Self-Dispersing Curable Epoxy Resins, Dispersions Made Therewith, and Coating Compositions Made Therefrom" (which is a continuation-in-part of U.S. Ser. No. 08/173,847, filed Dec. 27, 1993, now abandoned), the disclosures of which are incorporated herein by reference.

Other self-dispersing resins which can be employed herein are described in U.S. Ser. No. 08/366,190, U.S. Ser. No. 08/366,189, now U.S. Pat. No. 5,643,976, and U.S. Ser. No. 08/366,343, all filed Dec. 29, 1994, now U.S. Pat. No. 5,648,409, by K. S. Arora et al., the disclosures of which are incorporated herein by reference.

The Polyoxyalkyleneamine

The polyoxyalkyleneamine reactant comprises one or more amino-compounds where the amino-compound comprises both an amine group and a substantially water-soluble polyether chain. The polyoxyalkyleneamine reactant is soluble or at least partially soluble in water. Techniques to prepare suitable polyoxyalkyleneamine reactants are known in the art, and include reacting a hydroxyl group containing initiator with ethylene oxide and/or propylene oxide, followed by conversion of the resulting terminal hydroxyl group(s) to amine(s). Illustrative of the polyoxyalkyleneamine reactants employed in the invention are the Jeffamine (Reg. TM) brand of polyoxyalkyleneamines available from Texaco Chemical Company, Bellaire, Tex.

Polyoxyalkyleneamines of this invention have the structural formula

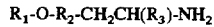

wherein $R_1$ designates a monovalent organic radical selected from the group consisting of $C_1$ to $C_{12}$ aliphatic, alicyclic or aromatic hydrocarbons, and $R_2$ represents a polyoxyalkylene chain having the structural formula:

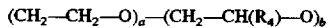

wherein $R_4$ is a monovalent organic radical selected from the group consisting of $C_1$ to $C_4$ aliphatic hydrocarbons, 'a' designates a number of ethoxy groups $(CH_2-CH_2-O)$, 'b' designates a number of monosubstituted ethoxy groups $(CH_2-CH(R_4)-O)$ where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and $R_3$ designates H or a monovalent organic radical selected from the group consisting of $C_1$ to $C_4$ aliphatic hydrocarbons.

In certain embodiments, the polyoxyalkyleneamine is adducted with an aliphatic polyepoxide and the adduct is reacted with an epoxy resin. In these embodiments, the preferred polyoxyalkyleneamines have $R_1$, $R_3$ and $R_4$ each equal to methyl, and either (i) a ratio of 'a' and 'b' of about 4:1, wherein the ethoxy and iso-propoxy groups are arranged in random blocks and the molecular weight of the polyoxyalkyleneamine is less than about 4,000, or (ii) a block of 5 ethoxy groups joined to a random sequence of ethoxy and iso-propoxy groups wherein the ratio of 'a' and 'b' in the random sequence is about 7:3 and the molecular weight of the polyoxyalkyleneamine is less than about 4,000, or (iii) a ratio of 'a' and 'b' of about 95:5, wherein the ethoxy and iso-propoxy groups are arranged substantially in two blocks and the molecular weight of the polyoxyalkyleneamine is less than about 6,000, or (iv) a ratio of 'a' and 'b' of about 7:3, wherein the ethoxy and iso-propoxy groups are present in random sequence and the molecular weight of the polyoxyalkyleneamine is less than about 4,000, or (v) a ratio of 'a' and 'b' of about 4:1, wherein the ethoxy and iso-propoxy groups are present in random sequence and the molecular weight of the polyoxyalkyleneamine is less than about 4,000.

The most preferred polyoxyalkyleneamine is Jeffamine (Reg. TM) M-2070 from Texaco Chemical Company, Bellaire Tex. According to Texaco, this polyoxyalkyleneamine is prepared by reacting methanol with ethylene oxide and propylene oxide followed by conversion of the resulting terminal hydroxyl group to an amine. The most preferred polyoxyalkyleneamine has an approximate molecular weight of 2,000 and a mole ratio of propylene oxide to ethylene oxide of 10/32.

In certain embodiments, the polyoxyalkyleneamine is directly reacted with an epoxy resin. In these embodiments, the polyoxyalkyleneamine will have a molecular weight of from about 3,000 to about 15,000 and will be directly reacted with the epoxy resin in a ratio of about 0.001 to 0.060 reactive equivalents of polyoxyalkyleneamine to about 1.0 reactive equivalents of epoxy resin. Preferred polyoxyalkyleneamines have $R_1$, $R_3$ and $R_4$ each equal to methyl, and either (i) a ratio of 'a' to 'b' of about 19:1 (e.g. a weight ratio of about 95% by weight ethoxy to about 5% by weight iso-propoxy), wherein the ethoxy and iso-propoxy groups are arranged substantially in two blocks and the molecular weight of the polyoxyalkyleneamine is from about 3,000 to about 4,000, or (ii) a random sequence of ethoxy and iso-propoxy groups wherein the ratio of 'a' and 'b' in the random sequence is about 7:3 (e.g. a weight ratio of about 70% by weight ethoxy to about 30% by weight iso-propoxy) and the molecular weight of the polyoxyalkyleneamine is from about 3,000 to about 4,000, or (iii) a ratio of 'a' to 'b' of about 9:1 (e.g. a weight ratio of about 90% by weight ethoxy to about 10% by weight iso-propoxy), wherein the ethoxy and iso-propoxy groups are arranged substantially in two blocks and the molecular weight of the polyoxyalkyleneamine is from about 5,000 to about 6,000, or (iv) a ratio of 'a' to 'b' of about 7:3 (e.g. a weight ratio of about 70% by weight ethoxy to about 30% by weight iso-propoxy), wherein the ethoxy and iso-propoxy groups are present in random sequence and the molecular weight of the polyoxyalkyleneamine is from about 5,000 to about 6,000, or (v) a ratio of 'a' to 'b' of about 9:1 (e.g. a weight ratio of about 90% by weight ethoxy to about 10% by weight iso-propoxy), wherein the ethoxy and iso-propoxy groups are arranged substantially in two blocks and the molecular weight of the polyoxyalkyleneamine is from about 9,000 to about 10,000 or (vi) a ratio of 'a' to 'b' of about 7:3 (e.g. a weight ratio of about 70% by weight ethoxy to about 30% by weight iso-propoxy), wherein the ethoxy and iso-propoxy groups are present in random sequence and the molecular weight of the polyoxyalkyleneamine is from about 9,000 to about 10,000.

The most preferred polyoxyalkyleneamines are the Jeffamine (Reg. TM) polyoxyalkyleneamines from Texaco Chemical Company, Bellaire Tex. According to Texaco, these polyoxyalkyleneamines are prepared by reacting methanol with ethylene oxide and propylene oxide followed by conversion of the resulting terminal hydroxyl group to an amine. The most preferred polyoxyalkyleneamine has an approximate molecular weight of 3,000 and a weight ratio of ethylene oxide to propylene oxide of about 19:1.

Another type of polyoxyalkyleneamine suitable for this invention has the structural formula:

$$[R_1\text{-O-}]_{2-m}\text{-}R_2\text{-}[CH_2CH(R_3)\text{-}X\text{-}R_4\text{-}NH_2]_m$$

wherein $R_1$ designates a monovalent organic radical selected from the group consisting of $C_1$ to $C_{12}$ aliphatic, alicyclic or aromatic hydrocarbons, and $R_2$ represents a polyoxyalkylene chain having the structural formula:

$$(CH_2\text{—}CH_2\text{—}O)_a\text{—}(CH_2\text{—}CH(R_5)\text{—}O)_b$$

wherein $R_5$ is a monovalent organic radical selected from the group consisting of $C_1$ to $C_4$ aliphatic hydrocarbons, 'a' designates a number of ethoxy groups ($CH_2$—$CH_2$—O), 'b' designates a number of monosubstituted ethoxy groups ($CH_2$—$CH(R_5)$—O)

where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and where the a:b ratio is greater than 1:1, $R_3$ designates H or a monovalent organic radical selected from the group consisting of $C_1$ to $C_4$ aliphatic hydrocarbons, $R_4$ is an aliphatic, cycloaliphatic or aromatic group containing 6 to 18 carbon atoms and X is equal to OC(O)NH, and m is equal to 1 or 2.

These polyoxyalkyleneamines can be obtained from monoethers of polyoxyalkylene diols or polyoxyalkylene diols and diisocyanates. Suitable monoethers of polyoxyalkylenediols or polyoxyalkylenediols have the structural formula $$[R_1\text{-O-}]_{2-m}\text{-}R_2\text{-}[CH_2CH(R_3)\text{—}OH]_m$$

wherein $R_1$ designates a monovalent organic radical selected from the group consisting of $C_1$ to $C_{12}$ aliphatic, alicyclic or aromatic hydrocarbons, and $R_2$ represents a polyoxyalkylene chain having the structural formula:

$$(CH_2\text{—}CH_2\text{—}O)_a\text{—}(CH_2\text{—}CH(R_5)\text{—}O)_b$$

wherein $R_5$ is a monovalent organic radical selected from the group consisting of $C_1$ to $C_4$ aliphatic hydrocarbons, 'a' designates a number of ethoxy groups ($CH_2$—$CH_2$—O), 'b' designates a number of monosubstituted ethoxy groups ($CH_2$—$CH(R_5)$—O)

where the substitution of one monosubstituted ethoxy group is independent from the substitution of any other monosubstituted ethoxy group in the polyoxyalkylene chain, the sum of 'a' and 'b' is equal to or greater than 10 but less than or equal to 200, and where the sequence of ethoxy and monosubstituted ethoxy groups within a polyoxyalkylene chain may be completely random and/or there may be blocks of ethoxy and/or monosubstituted ethoxy groups, and where the ratio of a:b is greater than 1:1.

$R_3$ designates H or a monovalent organic radical selected from the group consisting of $C_1$ to $C_4$ aliphatic hydrocarbons, and m is equal to 1 or 2.

Techniques to prepare suitable mono ethers of polyoxyalkylene diols are known in the art, and include reacting a hydroxyl group containing initiator with ethylene oxide and/or propylene oxide. The mono ether of polyoxyalkylene diol is reacted with a diisocyanate to form an isocyanate-terminated adduct which is then hydrolyzed to obtain one type of suitable polyoxyalkyleneamine.

$$R_1\text{—O—}R_2\text{—}CH_2CH(R_3)\text{—OH} + OCN\text{—}R_4\text{—NCO} \longrightarrow$$

$$R_1\text{—O—}R_2\text{—}CH_2CH(R_3)\text{—}O_2CNH\text{—}R_4\text{—NCO} \longrightarrow$$

$$R_1\text{—O—}R_2\text{—}CH_2CH(R_3)\text{—}O_2CNH\text{—}R_4\text{—}NH_2$$

The other type of suitable polyoxyalkyleneamines can be prepared by reactions of terminal hydroxyl groups of homopolymers of ethylene oxide or copolymers of ethylene oxide and monosubstituted ethylene oxide with diisocyanates followed by hydrolysis of the terminal isocyanate groups to amines.

$$HO\text{—}CH_2CH(R_3)\text{—}R_2\text{—}CH_2CH(R_3)\text{—OH} + OCN\text{—}R_4\text{—NCO} \longrightarrow$$

-continued

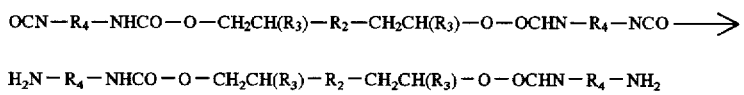

Preferred types of polyoxyalkyleneamines are those derived from reactions of diisocyanates with homopolymers of ethylene oxide or copolymers of ethylene oxide and propylene oxide. Preferred copolymers of ethylene oxide and propylene oxide are those available as Pluronic™ and Pluronic™ R surfactants from BASF Corporation, Parsipanny, N.J. According to the BASF literature these Pluronic™ surfactants are block copolymers of ethylene oxide and propylene oxide with different molecular weight and amount of ethylene oxide and propylene oxide. Most preferred Pluronic™ surfactants for the preparation of suitable polyoxyalkyleneamines are Pluronic™ F88, F98 and F108.

The monoether of polyoxyalkylene diol or polyoxyalkylene diol and diisocyanate are reacted in the presence of catalysts such as organotin compounds and tertiary amines. This reaction can be performed with or without organic solvents. Suitable organic solvents are those containing no reactive groups which can react with isocyanate groups. Examples of suitable solvents are ketones, esters, aromatic hydrocarbons, ethers, etc. Preferred solvents are acetone, methylethylketone, methylisobutylketone, ethyl acetate, butyl acetate, toluene, xylene, and tetrahydrofuran. An excess of diisocyanate equal to or greater than two equivalents per equivalent of hydroxyl group is used. Due to bifunctional nature of the diisocyanate, in addition to the mono-adduct of diisocyanate, the reaction products for monoethers of polyoxyalkylene diol also contain the bis-adduct of monoether of polyoxyalkylene diol as well as reactants namely monoether of polyoxylkylenediol and diisocyanate. However the reaction conditions chosen favor the formation of mono-adduct as major component of the product mixture. Due to bifunctional nature of the reactants, in addition to the adduct of diisocyanate and hydroxyl terminated polymers shown above, the reaction products for polyoxyalkylene diol also contain species with isocyanate and hydroxyl terminal groups, higher molecular weight adducts of diisocyanates and hydroxy-terminated polymers and the starting materials. However, the reaction conditions chosen favor the formation of adduct shown above as major component of the product mixture.

The hydrolysis of isocyanate group containing mono-adduct is performed with water in the presence of a mineral acid such as hydrochloric acid. The acid salt of the amine-terminated polyoxyalkyleneamine formed after hydrolysis is treated with a suitable base to generate the free amine form of the polyoxyalkyleneamine.

Suitable diisocyanates for the preparation of adducts include aliphatic, cycloaliphatic, or aromatic diisocyanates such as 1,6-hexamethylene diisocyanate, bis(4-isocyanatocyclohexyl)methane, isophoronediisocyanate, tolylenedissocyanate (available as mixture of 2,4- and 2,6-isomers) and metatetramethylxylenediisocyanate (m-TMXDI available from Cytec Industries).

The Polyepoxide

The polyepoxide reactant comprises one or more compounds each having a plurality of epoxide functional groups. The polyepoxide reactant has at least 2 epoxide groups present in the molecule, and may have as many as 6 epoxide groups present in the molecule. Techniques to prepare suitable polyepoxide compounds are known in the art, and include reacting compounds having a plurality of hydroxyl groups with epichlorohydrin in the presence of a suitable catalyst. Both aliphatic and aromatic polyepoxides are suitable for this invention. Suitable aliphatic polyepoxide compounds are commercially available from Henkel Corporation, Ambler, Penna., under the trademarks "Capcures Reg. TM" or "Photomers Reg. TM". One representative class of aliphatic polyepoxide reactant according to the invention has the structural formula:

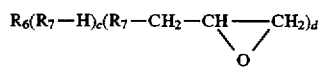

wherein $R_6$ designates a linear, branched or cyclic aliphatic or alicyclic organic radical having a valency equal to the sum of 'c' and 'd', where the sum of 'c' and 'd' is equal to or greater than 2 but no more than or equal to 6 and where 'd' is equal to or greater than 2 but less than or equal to 6. When the sum of 'c' and 'd' equals two (2), $R_6$ designates a linear, branched or cyclic aliphatic or alicyclic divalent organic radical having from 2 to 14 carbon atoms, and specifically includes the hydrocarbon portions of the dihydric alcohols ethylene glycol, butylene glycol, hexylene glycol, decanediol and dodecanediol which remain after the hydroxyl groups have been removed, and when the sum of 'c' and 'd' equals three (3), $R_6$ designates a linear, branched or cyclic aliphatic or alicyclic trivalent organic radical having from 3 to 14 carbon atoms, and specifically includes the hydrocarbon portions of the trihydric alcohols glycerol, 1,1,1-tris(hydroxymethyl)ethane, and 2-ethyl-2-(hydroxymethyl)-1 3-propanediol which remain after the hydroxyl groups have been removed, and when the sum of 'c' and 'd' equals four (4), $R_6$ designates a linear, branched or cyclic aliphatic or alicyclic tetravalent organic radical having from 5 to 30 carbon atoms, and specifically includes the hydrocarbon portion of the tetrahydric alcohol pentaerythritol which remains after the hydroxyl groups have been removed, and when the sum of 'c' and 'd' equals five (5), $R_6$ designates a linear branched or cyclic aliphatic or alicyclic pentavalent organic radical having from 6 to 30 carbon atoms, and when the sum of 'c' and 'd' equals six (6), $R_6$ designates a linear, branched or cyclic aliphatic or alicyclic hexavalent organic radical having from 8 to 30 carbon atoms, and specifically includes the hydrocarbon portion of the hexahydric alcohol dipentaerythritol which remains after the hydroxyl groups have been removed, and $R_7$ represents a divalent polyoxyalkylene chain having the structural formula:

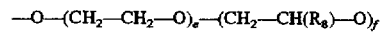

wherein $R_8$ is a monovalent organic radical selected from the group consisting of $C_1$ to $C_4$ aliphatic hydrocarbons 'e' designates a number of ethoxy groups ($CH_2$—$CH_2$—O), 'f' designates a number of monosubstituted ethoxy groups ($CH_2$—$CH(R_8)$—O) where the substitution of one monosubstituted ethoxy group is independent from the substitution of any other monosubstituted ethoxy group in the polyoxyalkylene chain, the sum of 'e' and 'f' is equal to or greater than 0 but less than or equal to 10, and where the sequence of ethoxy and monosubstituted ethoxy groups within a polyoxyalkylene chain may be completely random and/or there may be blocks of ethoxy and/or monosubstituted ethoxy groups.

The most preferred aliphatic polyepoxide compound is the reaction product of pentaerythritol, propylene oxide and epichlorohydrin, having an epoxide equivalent weight (EEW) of about 230.

Suitable aromatic polyepoxides include those disclosed in co-pending application U.S. Ser. No. 08/366,343, filed 29 Dec. 1994, now U.S. Pat. No. 5,648,409, entitled "Aqueous Self-Dispersible Epoxy Resin Based on Epoxy-Amine Adducts Containing Aromatic Polyepoxide" which is incorporated herein by reference. These include epoxy novolac resins such as Araldite EPN 1138 and 1139, epoxy cresol novolac resins such as Araldite ECN 1235, 1273, 1280 and 1299, epoxy phenol novolac resins such as Araldite PV 720, epoxy resin 0510, Araldite MY 720 and 721, and Araldite PT 810 all of which are available from Ciba-Geigy. Tetrad C and Tetrad X resins available from Mitsubishi Gas Chemical Co. are also suitable for use in this invention.

The Epoxy Resin

The epoxy resin used in the practice of this invention comprises one or more epoxy resins having two (2) or more epoxide groups and one (1) or more six-carbon aromatized rings present in the molecule, as represented by the structural formula:

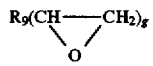

wherein $R_9$ represents a 'g' valent $C_6$–$C_{50}$ organic radical comprising at least one six-carbon aromatized ring (e.g. when g is 2, $R_9$ can be —$CH_2$—O—$\phi$—$C(CH_3)_2$—$\phi$—O—$CH_2$— or $R_9$ can be —$CH_2$—O—$\phi$—$CH_2$—$\phi$—O—$CH_2$— wherein $\phi$ represents a phenyl group), and 'g' is equal to or greater than 2 but less than or equal to 6.

Techniques to prepare such epoxy resins are known in the art, and include reacting compounds having 2 or more hydroxyl groups with epichlorohydrin in the presence of a suitable catalyst. Suitable epoxy resins are commercially available from a variety of sources and include EPON (Reg. TM) epoxy resins from Shell Chemical Company, Houston, Tex., and DER (Reg. TM) or DEN (Reg. TM) epoxy resins from Dow Chemical Company, Midland, Mich.

Examples of suitable epoxy resins are:

I) Polyglycidyl and poly(beta-methylglycidyl) esters obtainable by reacting a compound having at least two carboxy groups in the molecule with epichlorohydrin or beta-methyl-epichlorohydrin, respectively. The reaction is advantageously carried out in the presence of bases. Examples of aromatic polycarboxylic acids which may be used include, for example, phthalic acid, isophthalic acid or terephthalic acid.

II) Polyglycidyl or poly(beta-methylglycidyl) ethers obtainable by reacting a compound having at least two free phenolic hydroxy groups with epichlorohydrin or beta-methyl-epichlorohydrin, respectively, under alkaline conditions, or in the presence of an acid catalyst and with subsequent alkali treatment.

The epoxy compounds of this type may be derived from mononuclear phenols, such as, for example, resorcinol or hydroquinone; or they are based on polynuclear phenols, such as, for example, bis(4-hydroxyphenyl)methane, 4,4'-dihydroxybiphenyl, bis(4-hydroxyphenyl)sulfone, 1,1,2,2-tetrakis(4-hydroxyphenyl)ethane, 2,2-bis(4-hydroxyphenyl) propane, 2,2-bis(3,5-dibromo-4-hydroxyphenyl) propane, and from novolacs obtainable by condensation of aldehydes, such as formaldehyde, acetaldehyde, chloral or furfuraldehyde, with phenols, such as phenol, or with phenols that are substituted in the nucleus by halide atoms or $C_1$–$C_{18}$ (preferably $C_1$–$C_9$) alkyl groups, such as, for example, 4-chlorophenol, 2-methylphenol or 4-tert-butylphenol, or by condensation with bisphenols, in the manner described above.

There are preferably used epoxy resins that have an epoxy content of from 2 to 10 equivalents/mole and that are glycidyl ethers or glycidyl esters of aromatic or alkylaromatic compounds. Especially preferred epoxy resins are polyglycidyl ethers of bisphenols, such as, for example, of 2,2-bis(4-hydroxyphenyl)propane (bisphenol A) or bis(4-hydroxyphenyl)methane (bisphenol F), or novolacs formed by reacting formaldehyde with a phenol. For reasons of cost and availability, the most preferred epoxy resins are polyglycidyl ethers based on bisphenol A.

Preferred epoxy resins have an epoxide equivalent weight of less than about 400 grams/equivalent, e.g. from about 100 grams/equivalent to about 350 grams/equivalent, more preferably from about 150 grams/equivalent to about 225 grams/equivalent, e.g. DER 331 available from Dow Chemical at about 182 grams/equivalent.

The Polyhydric Phenol

The polyhydric phenol reactant comprises one or more compounds each having a plurality of hydroxyl groups covalently bonded to one or more six-carbon aromatized rings. The polyhydric phenol reactant may contain substituents such as alkyl, aryl, sulfido, sulfonyl, halo, and the like. The polyhydric phenol is represented by the structural formula:

wherein $R_{10}$ represents an 'h' valent $C_6$–$C_{50}$ organic radical comprising at least one six-carbon aromatized ring, and 'h' represents a number of phenolic hydroxyl groups where 'h' is equal to or greater than 2 but less than or equal to 6.

Techniques to prepare suitable polyhydric phenol compounds are known in the art. Suitable polyhydric phenol compounds are commercially available from Dow Chemical Company, Midland, Mich., and Shell Chemical Company, Houston, Tex.

Illustrative of suitable polyhydric phenols are 2,2-bis(4-hydroxyphenyl)propane, 2,2-bis(3-bromo-4-hydroxyphenyl)-propane, 2,2-bis(3,5-dichloro-4-hydroxyphenyl)propane, 2,2-bis(3-chloro-4-hydroxyphenyl)propane, bis(4-hydroxyphenyl)-methane, bis(4-hydroxyphenyl)sulfone, bis(4-hydroxyphenyl)sulfide, resorcinol, hydroquinone, phenol-formaldehyde novolac resins, and the like. The most preferred dihydric phenols are 2,2-bis(4-hydroxyphenyl)propane (bisphenol A) and bis(4-hydroxyphenyl)methane (bisphenol F) for reasons of cost and availability.

The Amine-Epoxy Adduct

The preparation of certain of the self-dispersing curable epoxy resins of the invention proceeds through an amine-epoxy adduct, where the amine-epoxy adduct is subsequently reacted with an epoxy resin and, optionally, a polyhydric phenol. The structure of the amine-epoxy adduct is a complex mixture dependent on the structures of the polyoxyalkyleneamine and the polyepoxide used in the preparation of the amine-epoxy adduct, as well as the relative ratio of the reactants.

The Self-Dispersing Curable Epoxy Resin

Certain of the self-dispersing curable epoxy resins of the invention are prepared by reacting an amine-epoxy adduct with a polyhydric phenol and an epoxy resin. The structure and composition of the self-dispersing curable epoxy resin will depend on the identity of the amine-epoxy adduct, the identity of the epoxy resin, the identity of the polyhydric phenol and the relative ratio of the reactants.

Esterification of Self-Dispersing Curable Epoxy Resin with Fatty Acids

The epoxy resin is reacted with drying oil or semidrying oil fatty acids to esterify at least a portion of the epoxy groups of the epoxy resin. Typically, the amount of fatty acids will be essentially equal on a stoichiometric basis to the epoxy equivalents of the epoxy resin, e.g. a ratio of from about 0.9:1 to about 1.1:1, typically from about 0.95:1 to about 1.05:1, and more typically from about 0.98:1 to about 1.02:1, fatty acid equivalents per epoxy equivalents.

The reaction may typically be accomplished by first adding an organic cosolvent to the crude epoxy resin reaction mixture and then adding the fatty acids to the resulting mixture, but the use of the organic cosolvent is optional. The reaction is typically accomplished at elevated temperature, e.g. 120° C. to 180° C. The course of the reaction can be followed by measuring the acid number of the product and terminating the reaction when a sufficiently low acid number is attained, e.g. an acid number of less than about 5, more typically less than about 2.

Organic Cosolvents

The self-dispersing curable epoxy resin of the present invention may be combined with a non-reactive, organic cosolvent. The cosolvent serves to reduce the viscosity of the self-dispersible curable epoxy resin before its dispersion in water as well as that of the aqueous pre-emulsion of the epoxy resin and the aqueous emulsion that is formed by reduction of the particle size of the resin in the pre-emulsion. Another function that the organic cosolvent may perform is the prevention of agglomeration of dispersed resin particles which stabilizes the dispersion of the resin. A variety of organic cosolvents are considered suitable for use in this invention. Suitable cosolvents consist of non-solvents as well as solvents for the self-dispersible epoxy resins. The cosolvent may be miscible, partly miscible or immiscible with water. Mixtures of two or more organic cosolvents can also be employed in this invention. Examples of organic cosolvents include the lower fatty acid esters or alkyl ethers of monohydric and dihydric alcohols (or polyethers thereof), wherein the alkyl group comprises $C_1$–$C_8$ linear or branched aliphatic or alicyclic chains and lower alkyl ketones, e.g. ketones having a total of from 3 to 6 carbon atoms, preferably methyl lower-alkyl ketones, wherein said lower alkyl group has from 1 to 3 carbon atoms. The choice of cosolvent can affect the pot-life of the self-dispersing curable epoxy resin. For example, for a given resin it may be possible to increase the pot-life by substituting for a cosolvent such as Ektasolve EP (Eastman Chemicals) with one of the following cosolvents (the greater increase being obtained in order): 1-methoxy-2-propyl acetate, methyl n-amyl ketone, or dipropylene glycol n-butyl ether.

Preparation of the Self-Dispersing Curable Epoxy Resin

In preparing certain of the self-dispersing curable epoxy resins of this invention, an amine-epoxy adduct is first prepared by combining the polyoxyalkyleneamine reactant and the aliphatic polyepoxide reactant, heating the mixture slowly to about 130° C., holding the mixture at temperature for about 2.5 hours, and then discharging the amine-epoxy adduct from the reactor. The respective self-dispersing epoxy resin is prepared by combining the amine-epoxy adduct, the polyhydric phenol and the epoxy resin, and heating the mixture in the presence of a catalyst, e.g., potassium hydroxide, triphenyl phosphine, benzyl dimethylamine and the like, to a temperature of about 150° C. with stirring. An exothermic reaction will then occur, and cooling is applied to maintain the reaction temperature at about 150°–160° C. The mixture is maintained at about 160° C. for about one hour subsequent to the conclusion of the exothermic reaction. If the reaction has not proceeded to the desired degree of completion (as determined by the epoxide equivalent weight of the resin), the mixture is then heated to 190° C. The mixture is then maintained at 190° C. for about 15 minutes in order to drive the reaction to the desired degree of completion, then cooled to about 160° C. whereupon a small amount of a water-soluble organic solvent may be added prior to addition of drying oil fatty acids in an amount equal on a stoichiometric basis the epoxy equivalents of the epoxy resin. The use of the water-soluble cosolvent is optional. A reaction temperature of about 150° C. is maintained until the acid number of the reaction mixture falls to less than about 2 followed by cooling and discharging the self-dispersing curable epoxy resin ester from the reactor.

In certain embodiments, the polyoxyalkyleneamine is reacted directly with the epoxy resin to prepare a self-dispersing curable epoxy resin which is then esterified. The conditions employed for such reactions may be similar to the conditions under which the amine-epoxy adduct is formed.

Preparation of an Aqueous Dispersion of the Self-Dispersing Curable Epoxy Resin Ester The aqueous epoxy resin ester dispersion of the invention can be prepared by charging the self-dispersing curable epoxy resin ester, as a mixture with an organic cosolvent, to a reaction vessel, then heating the resin to about 50°–100° C. with stirring. Water is then mixed with the mixture of organic cosolvent and self-dispersing curable epoxy resin ester to form an aqueous pre-emulsion which will typically be a disperse oil phase having a larger particle size. The relative amounts of the resin ester, water and organic cosolvent can vary broadly, but will typically be roughly equal, e.g. the amounts of each of resin ester, water and organic cosolvent will range between about 20% to about 50% each, more typically from about 35% to about 45% resin ester, and about 25% to about 35% each of water and organic cosolvent.

The particle size of the oil phase in the aqueous dispersion can be modified by physical techniques to reduce the particle size. The particle size reduction is preferably accomplished by subjecting the aqueous dispersion to high shear, e.g. in a homogenizer such as that disclosed in U.S. Pat. No. 4,533,254 (Cook et al.), the disclosure of which is incorporated herein by reference, and commercially available as MICROFLUIDIZER™ from Microfluidics Corporation, Newton, Mass. Homogenizers are discussed in W. C. Griffin, "Emulsions", *Encyclopedia of Chemical Technology*, Vol. 8, pp. 900–930 (Kirk-Othmer, eds., John Wiley & Sons, Inc., New York, N.Y., 3d ed., 1979), the disclosure of which is incorporated herein by reference. The reduction of particle size should be effective to reduce the mean (weight average) particle size of the oil phase in the aqueous dispersion to less than about 5 microns, preferably less than about 3 microns and typically less than 1 micron, e.g. typically from about 0.1 to about 3 microns. One or more reactive diluents can be mixed into the pre-emulsion prior to reduction of particle size or they can be added to the aqueous dispersion after the reduction of the particle size.

If desired, after reduction of the particle size, at least a portion of the organic cosolvent can be removed. The organic cosolvent is removed by volatilizing the same from the mixture. This is an evaporative process that may be considered a distillation. Sufficient organic cosolvent should be removed so that the aqueous dispersion will be low in volatile organic compounds, and preferably essentially free of such compounds. Typically, less than 1%, more typically less than 0.1% by weight of organic cosolvent remains in the aqueous dispersion.

Removal of the organic cosolvent will be facilitated by subjecting an agitated dispersion to elevated temperatures and/or reduced pressures, e.g. a vacuum distillation. The precise temperature and pressure employed to effect removal of the organic cosolvent will, of course, depend upon the volatility of the organic cosolvent chosen, but temperatures that will cause degradation or polymerization of the resin ester should be avoided. Distillation is discussed in E. Hafslund, "Distillation", *Encyclopedia of Chemical Technology*, vol. 7, pp. 849–891 (Kirk-Othmer, eds. John Wiley & Sons, N.Y., 3d ed. 1979) and evaporation is discussed in F. Standiford, "Evaporation", *Encyclopedia of Chemical Technology*, vol. 9, pp. 472–493 (Kirk-Othmer, eds. John Wiley & Sons, N.Y., 3d ed. 1980), the disclosures of which are incorporated by reference.

The aqueous dispersion of self-dispersing resin ester will typically exhibit excellent chemical and physical stability over an extended shelf-life, e.g. of from five to six months. As an example of physical stability, the resin ester should not display layer formation for a period of at least one month from the preparation of the aqueous dispersion, i.e. there should be no formation of a macro-observable water phase as a layer separate from the dispersed resin ester phase.

The coating composition of the invention is prepared by diluting the aqueous epoxy ester dispersion with a suitable aqueous solvent to obtain the desired application viscosity. The coating composition also preferably contains a drier reactive with the drying oil fatty acid portion of the ester. Examples of driers are salts of metals such as cobalt, lead, manganese, cerium, copper, chromium, iron, tin, vanadium and zirconium. Examples of useful salts are the metal salts of complex fatty acids, present singly or as mixtures. Specific examples of useful driers are the octoates, resinates, naphthenates, neodecanoates, tallates and linoleates and mixtures thereof of metals such as cobalt, manganese, cerium, zirconium and mixtures thereof. The coatings of the present invention will typically contain one or more said driers, present in a total amount of about 0.5 to 5 wt. %, based on the weight of the resin ester. If desired, a small amount, e.g. 0.1–1.0 wt. %, of a drier activator may be included in order to enhance the activity of the drier; examples of drier activators are 2,2'-bipyridyl and 1,10-phenanthroline.

An aqueous epoxy resin ester paint composition of the present invention may further contain additives conventionally employed in coating technology, such as organic pigments, inorganic pigments, surfactants, thickeners, and the like.

Other resins can be mixed with the coating composition. Examples of such other resins are the aminoplast and phenolplast resins. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes include formaldehyde, acetaldehyde and propionaldehyde. The aminoplast resins can be used in the alkylol form but, preferably, are utilized in the ether form wherein the etherifying agent is a monohydric alcohol containing from 1 to 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of suitable phenols are phenol, o, m or p-cresol, 2,4-xylenol, 3,4-xylenol, 2,5-xylenol, cardanol, p-tert-butyl phenol, and the like. Useful aldehydes are formaldehyde, acetaldehyde and propionaldehyde. Particularly useful phenolplast resins are polymethylol phenols wherein the phenolic group is etherified with an alkyl, e.g., methyl or ethyl, group. The following examples are further illustrative of the present invention. The reactants and other specific ingredients are presented as being typical, and various modifications can be derived in view of the foregoing disclosure within the scope of the invention.

EXAMPLES

Examples 1–3

Preparation of esters of self-dispersible epoxy resins

Preparation of Amine-epoxide Adduct

Into a reaction flask equipped with a stirrer, heating mantle, nitrogen line, cooling condenser, and thermometer is charged 480 parts by weight (0.40 equivalents) of a polyoxyalkyleneamine (available as Jeffamine 2070 from Huntsman Corporation, Houston, Tex.) and 142.2 parts by weight (0.61 equivalents) of polyepoxide of propoxylated (5PO) pentaerythritol (Henkel Corporation, Ambler, Pa.). The reaction mixture is heated slowly to 125°–130° C. with stirring and held at this temperature for about 2.5 hours. The reaction mixture is then cooled to 70° C. and analyzed for epoxide and amine content. The product amine polyepoxide adduct has 0.4 meq./gm of total amine and 0.33 meq./gm of epoxide which indicates that about 66% of the initial free epoxide groups have been reacted with the amine.

The preparation of resin was done in a suitable size resin kettle, equipped with overhead stirrer, thermocouple, heating mantle, means to control temperature such as Jack-o-matic™, condenser, nitrogen atmosphere and addition flasks. The resin kettle was charged with a liquid epoxy resin (DER 331, Dow Chemical Co., Midland, Mich., a liquid diglycidyl ether of bisphenol A having an epoxy equivalent weight of about 190 grams/eq.), bis-phenol A, the amine-epoxide adduct and catalyst (triphenyl phosphine or ethyl triphenylphosphonium iodide). The mixture was heated with stirring under nitrogen atmosphere to 160° C. Cooling or heating is applied as needed to maintain the temperature of reaction between 155°–160° C. Progress of reaction was monitored by determination of the epoxy equivalent weight using 0.1N perchloric acid solution and crystal violet indicator. After completion of the epoxy advancement reaction, linoleic acid (EMERSOLO® 315, Emery Chemicals, Henkel Corporation) and catalyst (triphenylphosphine) were added. The reaction was continued at 155°–160° C. for one hour. Progress of reaction was monitored by determination of the epoxy equivalent weight and acid value (with aqueous 0.1 n sodium hydroxide in 2-propoxyethanol solvent with phenolphthalein indicator). When acid value and epoxy equivalent weight of the reaction mixture indicated completion of reaction, batch was cooled to 120° C. and 2-propoxyethanol solvent was added. The product was then allowed to cool to 95° C. and first portion of water was added slowly with good agitation. Cooling with good agitation was continued until the batch inverted from a water-in-oil to oil-in-water dispersion. The second portion of water was added slowly over 1–2 hours with good agitation. The resulting dispersion was analyzed for particle size, solids and viscosity. Composition of dispersions are given in Table 1 and their characteristics are given in Table 2.

TABLE 1

Composition of Self-dispersible Epoxy Esters

| Component | Composition, parts by weight | | |
|---|---|---|---|
| | Example 1 | Example 2 | Example 3 |
| DER 331 | 27.41 | 28.20 | 28.85 |
| Bis-phenol A | 10.98 | 12.61 | 14.24 |
| Am/Ep Adduct | 4.51 | 4.78 | 5.05 |
| Catalyst I | 0.04 | 0.05 | 0.05 |
| EMERSOL 3315 | 13.17 | 10.58 | 7.73 |
| Catalyst II | 0.11 | 0.24 | 0.24 |
| 2-Propoxyethanol | 5.71 | 6.16 | 7.73 |
| Water I | 9.87 | 11.17 | 10.85 |
| Water II | 28.20 | 26.21 | 25.26 |
| Total | 100.00 | 100.00 | 100.00 |

TABLE 2

Characteristics of Self-dispersible Epoxy Esters

| Characteristic | Value for | | |
|---|---|---|---|
| | Example 1 | Example 2 | Example 3 |
| Epoxy Equiv. Weight I[1] | 908 | 1206 | 1729 |
| Epoxy Equiv. Weight II[2] | 37,382 | 50,136 | 104,912 |
| Acid Value | 3.6 | 2.9 | 3.2 |
| Particle Size, micron | 3.6 | 2.9 | 3.2 |
| Solids, % | 57.0 | 55.0 | 54.0 |

[1]Before addition of fatty acids.
[2]After reaction with fatty acids.

Example 4
Water-Dispersible Coatings from Epoxy Esters

A pigmented coating was formulated from the epoxy ester of Example 4 above according to the following formula.

| Ingredient | Amount, parts by wt. |
|---|---|
| Epoxy Ester of Example 3 | 496.86 |
| 2-Propoxyethanol | 50.93 |
| Raven 1040 Powder[1] | 12.50 |
| Halox SZP391[2] | 50.00 |
| Wollastocoat 10AS[3] | 322.16 |
| Above were mixed with a high speed mixer to a Hegman gauge grind of 5+. | |
| Deionized Water | 168.23 |
| Water was added as required to adjust the grind viscosity. | |
| Cobalt Hydro-Cure II[4] | 4.45 |
| Manganese Hydro-Cure II[4] | 4.45 |
| Active-8[5] | 2.04 |
| Above ingredients were mixed when temperature of the grind was below 90° F. | |

[1]colorant pigment, Columbia Chemical Company.
[2]anticorrosive pigment, Halox Pigments, Inc.
[3]anticorrosive pigment, Nyco Minerals, Inc.
[4]drier, Mooney Chemicals, Inc., Cleveland, Ohio
[5]drier promoter, R. T. Vanderbilt Co.

The above coating was spray applied over Bonderite B-1000 (Advanced Coatings Technology) and cold-rolled steel panels to obtain dry film thickness of 1.5–2 mils after baking. The dry coatings were tested for salt-spray resistance according to ASTM method B-117. No corrosion from scribed areas was observed after 350 hours of salt spray exposure.

Example 5

The preparation of resin was done in a suitable size resin kettle, equipped with overhead stirrer, thermocouple, heating mantle, means to control temperature such as Jack-o-matic™, condenser, nitrogen atmosphere and addition flasks. The resin kettle was charged with 250 parts by weight of a liquid epoxy resin (DER 331, Dow Chemical Co., Midland, Mich., a liquid diglycidyl ether of bisphenol A having an epoxy equivalent weight of about 190 grams/eq.), 123.4 parts by weight of bis-phenol A, 43.8 parts by weight of the amine-epoxide adduct used in Examples 1–3 and 0.4 parts by weight of catalyst (triphenyl phosphine or ethyl triphenylphosphonium iodide). The mixture was heated with stirring under nitrogen atmosphere to 160° C. Cooling or heating is applied as needed to maintain the temperature of reaction between 155°–160° C. Progress of reaction was monitored by determination of the epoxy equivalent weight using 0.1N perchloric acid solution and crystal violet indicator. After 1.5 hours, the epoxy equivalent weight is found to be 1700 gram/eq. After completion of the epoxy advancement reaction, the mixture was cooled to 150° C. and 98 parts by weight of 2-propoxyethanol was added and stirred until homogeneous. Then 69 parts by weight of linoleic acid (EMERSOL® 315, Emery Chemicals, Henkel Corporation) and 1 part by weight of catalyst (triphenylphosphine) was added. The reaction was continued at 150° C. for one hour. Progress of reaction was monitored by determination of the epoxy equivalent weight and acid value (with aqueous 0.1N sodium hydroxide in 2-propoxyethanol solvent with phenolphthalein indicator). When the acid value fell to less than 2, batch was cooled to 95° C. and 105 parts by weight of water were added. The product was then allowed to cool to 63° C. and good agitation was continued until the batch inverted from a water-in-oil to oil-in-water dispersion. Then a second portion of water, 195 parts by weight, was added to obtain an aqueous dispersion at 57% by weight solids.

What is claimed is:

1. A process for preparing a self-dispersing curable epoxy resin ester, said process comprising reacting a self-dispersing curable epoxy resin based on a polyoxyalkyleneamine with a fatty acid selected from the group consisting of drying oil and semi-drying oil fatty acids, said self-dispersing curable epoxy resin being prepared by reacting (a) 1.0 reactive equivalents of an epoxy resin, (b) from about 0.01 to 1.0 reactive equivalents of a polyhydric phenol, per reactive equivalent of said epoxy resin, and (c) from about 0.005 to 0.5 reactive equivalents, per reactive equivalent of said epoxy resin, of an amine-epoxy adduct prepared by reacting a polyoxyalkyleneamine and an aliphatic polyepoxide, wherein the ratio of the reactive equivalents of the polyoxyalkyleneamine and the aliphatic polyepoxide is in the range from about 0.3:1 to 0.9:1.

2. A process as claimed in claim 1 wherein said reactive equivalents of said polyhydric phenol are from about 0.4 to about 0.6 reactive equivalents.

3. A process as claimed in claim 1 further comprising combining said self-dispersing curable epoxy resin with an organic cosolvent selected from the group consisting of fatty acid esters or alkyl ethers of monohydric and dihydric alcohols, and polyethers thereof, wherein the alkyl group comprises $C_1$–$C_8$ linear or branched aliphatic or alicyclic chains and ketones having a total of from 3 to 6 carbon atoms.

4. A process as claimed in claim 3 wherein said organic cosolvent is a methyl lower-alkyl ketone, wherein said lower alkyl group has from 1 to 3 carbon atoms.

5. A process as claimed in claim 1 wherein said fatty acid is comprised of linoleic acid and the sum of the weight percent of linoleic acid and twice the weight percent of linolenic acid, if any, of said fatty acid is from about 50 to about 200.

6. A process as claimed in claim 1 wherein said fatty acid is comprised of linoleic acid and the sum of the weight percent of linoleic acid and twice the weight percent of linolenic acid, if any, of said fatty acid is from about 65 to about 150.

7. A process as claimed in claim 1 wherein said fatty acid is comprised of linoleic acid and the sum of the weight percent of linoleic acid and twice the weight percent of linolenic acid, if any, of said fatty acid is from about 75 to about 135.

8. A process as claimed in claim 1 wherein the average number of methylene groups between two double bonds or pairs of conjugated double bonds per fatty acid molecule is from about 0.5 to about 2.

9. A process as claimed in claim 1 wherein the average number of methylene groups between two double bonds or pairs of conjugated double bonds per fatty acid molecule is from about 0.67 to about 1.67.

10. A process as claimed in claim 1 wherein the average number of methylene groups between two double bonds or pairs of conjugated double bonds per fatty acid molecule is from about 0.73 to about 1.4.

11. A process as claimed in claim 1 wherein said fatty acids are comprised of a major amount by weight of linoleic acid and a minor amount by weight of linolenic acid.

12. A process as claimed in claim 1 wherein said fatty acid is a mixture of fatty acids selected from the group consisting of fatty acids derived from linseed oil, soybean oil, perilla oil, safflower oil, sunflower oil, walnut oil, menhaden oil, pilchard oil, sardine oil, tung oil, tall oil, and dehydrated castor oil.

13. A process as claimed in claim 1 wherein the amount of said fatty acids is approximately equal on a stoichiometric basis to the epoxy equivalents of said epoxy resin.

14. A process as claimed in claim 1 wherein the ratio of acid equivalents of said fatty acid to epoxy equivalents of said epoxy resin is from about 0.9:1 to about 1.1:1.

15. A process as claimed in claim 1 wherein the ratio of acid equivalents of said fatty acid to epoxy equivalents of said epoxy resin is from about 0.95:1 to about 1.05:1.

16. A process as claimed in claim 1 wherein the ratio of acid equivalents of said fatty acid to epoxy equivalents of said epoxy resin is from about 0.98:1 to about 1.02:1.

17. A self-dispersing epoxy resin ester prepared by the process of claim 1.

18. An aqueous dispersion comprising a self-dispersing epoxy resin ester prepared by the steps comprising (a) reacting a self-dispersing curable epoxy resin based on a polyoxyalkyleneamine with a fatty acid selected from the group consisting of drying oil and semi-drying oil fatty acids and (b) diluting the resulting epoxy resin ester with a major amount of water and a minor amount of organic cosolvent, wherein said preparing comprises first preparing an amine-epoxy adduct by contacting a polyoxyalkyleneamine and an aliphatic polyepoxide, where the ratio of the reactive equivalents of the polyoxyalkyleneamine and the polyepoxide is in the range from about 0.3:1 to 0.9:1, and then contacting said amine-epoxy adduct with a polyhydric phenol and an epoxy resin, where the ratio of the reactive equivalents of the polyhydric phenol and the epoxy resin is in the range from about 0.01:1 to about 1.0:1, and where the ratio of the reactive equivalents of the amine-epoxy adduct and the epoxy resin is in the range from about 0.005:1 to about 0.5:1 to produce a self-dispersing curable epoxy resin.

19. A coating composition comprising a self dispersing epoxy ester resin prepared by the process of claim 1 and a drier reactive with the drying oil fatty acid portion of the ester.

20. A coating composition of claim 19 wherein said drier is selected from the group consisting of salts of metals selected from the group consisting of cobalt, lead, manganese, cerium, copper, chromium, iron, tin, vanadium and zirconium.

21. A coating composition of claim 20 wherein said drier is a metal salt of a fatty acid.

22. A coating composition of claim 19 wherein said drier is a member selected from the group consisting of octoates, resinates, naphthenates, neodecanoates, tallates, linoleates and mixtures thereof, of a metal selected from the group consisting of cobalt; manganese, cerium, zirconium and mixtures thereof.

23. A coating composition of claim 19 wherein said drier is present in a total amount of about 0.5 to 5 wt. %, based on the weight of the resin.

24. A process for preparing a self-dispersing curable epoxy resin ester, said process comprising:
preparing an amine-epoxy adduct by contacting a polyoxyalkyleneamine and an aliphatic polyepoxide, where the ratio of the reactive equivalents of the polyoxyalkyleneamine and the polyepoxide is in the range from about 0.3:1 to 0.9:1,
reacting said amine-epoxy adduct with an epoxy resin in the presence of a polyhydric phenol, where the ratio of the reactive equivalents of the polyhydric phenol and the epoxy resin is in the range from about 0.01:1 to about 1.0:1, and where the ratio of the reactive equivalents of the amine-epoxy adduct and the epoxy resin is in the range from about 0.005:1 to about 0.5:1 to produce a self-dispersing curable epoxy resin,
reacting said self-dispersing curable epoxy resin with a fatty acid selected from the group consisting of drying oil and semi-drying oil fatty acids, where the ratio of acid equivalents of said fatty acid to epoxy equivalents of said epoxy resin is from about 0.9:1 to about 1.1:1.

25. A process of claim 24 wherein the average number of methylene groups between two double bonds or pairs of conjugated double bonds per fatty acid molecule is from about 0.5 to about 2.

26. A process of claim 24 wherein said fatty acids are comprised of a major amount by weight of linoleic acid and a minor amount by weight of linolenic acid.

27. A process of claim 24 wherein said fatty acid is a mixture of fatty acids selected from the group consisting of fatty acids derived from linseed oil, soybean oil, perilla oil, safflower oil, sunflower oil, walnut oil, menhaden oil, pilchard oil, sardine oil, tung oil, tall oil, and dehydrated castor oil.

* * * * *